United States Patent [19]

Kocher

[11] Patent Number: 4,707,073

[45] Date of Patent: Nov. 17, 1987

[54] FIBER OPTIC BEAM DELIVERY SYSTEM FOR HIGH-POWER LASER

[75] Inventor: Robert C. Kocher, San Jose, Calif.

[73] Assignee: Raytheon Company, Lexington, Mass.

[21] Appl. No.: 772,590

[22] Filed: Sep. 4, 1985

[51] Int. Cl.⁴ .............................. G02B 6/34; G02B 6/32
[52] U.S. Cl. ................................. 350/96.23; 350/96.18
[58] Field of Search ............... 33/DIG. 21; 350/96.15, 350/96.18, 96.20, 96.23, 96.24, 96.29, 96.30; 372/34; 408/701

[56] References Cited

U.S. PATENT DOCUMENTS

| | | | |
|---|---|---|---|
| 4,421,382 | 12/1983 | Doi et al. | 350/96.2 |
| 4,475,788 | 10/1984 | Tomassini et al. | 350/96.18 X |
| 4,572,609 | 2/1986 | Sakuragi et al. | 350/96.29 X |
| 4,578,554 | 3/1986 | Coulter | 219/121 L C |

OTHER PUBLICATIONS

Fugardi, F. F., et al., "Laser Drilled Holes in Fired Ceramics", IBM Tech. Dis. Bull., vol. 14, No. 10, Mar. 1972, p. 2869.
M. Jones/G. Georgalas, "Flexible Beam Delivery for Material Processing Laser Power Through a Fiber Optic Cable"; *Laser News;* Jul. 1984; pp. 11–12.
"High-Power Fiber Aids Laser Processing"; *High Technology;* Nov. 1983; p. 13.
"Laser Energy Directed to Target by Fiber Optics"; *Machine Design;* p. 10.
M. Jones/G. Georgalas, "Kilowatts of Peak Laser Power Transmitted through a Fiber Optic Cable for Material Processing"; Abstract No. ThU14–1, General Electric Company.

*Primary Examiner*—Eugene R. LaRoche
*Assistant Examiner*—Steven J. Mottola
*Attorney, Agent, or Firm*—Peter J. Devlin; Richard M. Sharkansky

[57] ABSTRACT

A system is provided for delivering a high-power laser beam through a fiber optic cable to a metal workpiece for drilling, cutting or welding the workpiece. The laser beam is focused onto a first end of the fiber optic cable, with a gas being applied to the first end of the cable as a cooling agent. The gas is transmitted coaxially with the fiber optic cable along the length thereof. The laser beam emerges from a second end of the fiber optic cable and is received and focused onto a workpiece by a beam delivery assembly. The transmitted gas is applied to the second end of the fiber optic cable as a cooling agent and injected onto the workpiece coaxially with the focused laser beam. With such arrangement, a laser beam is delivered to a workpiece for processing the workpiece via a flexible system, allowing the beam to be dexterously maneuvered about the workpiece. Also, since the gas cooling agent is applied to the workpiece coaxially with the focused beam, the gas may comprise an element which assists the laser beam in processing the workpiece. Also included is a mechanism for facilitating connection of the beam delivery assembly to an arm for maneuvering the beam delivery assembly through a plurality of positions with respect to the workpiece. Such mechanism inhibits rotation of the beam delivery assembly and the fiber optic cable during such maneuvering, thus preventing rotational strain from being applied to the cable and reducing the possibility of cable breakage.

19 Claims, 4 Drawing Figures

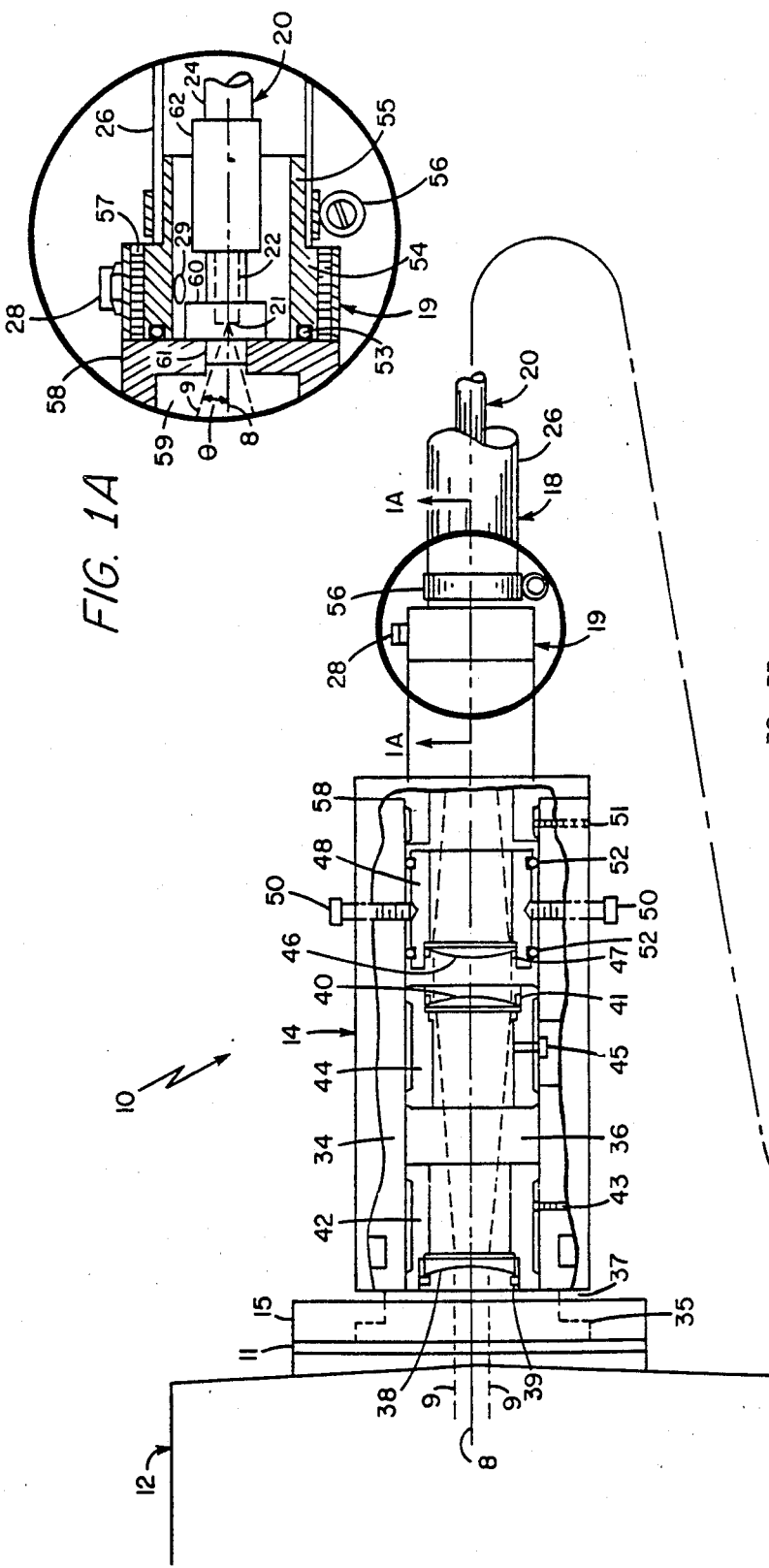
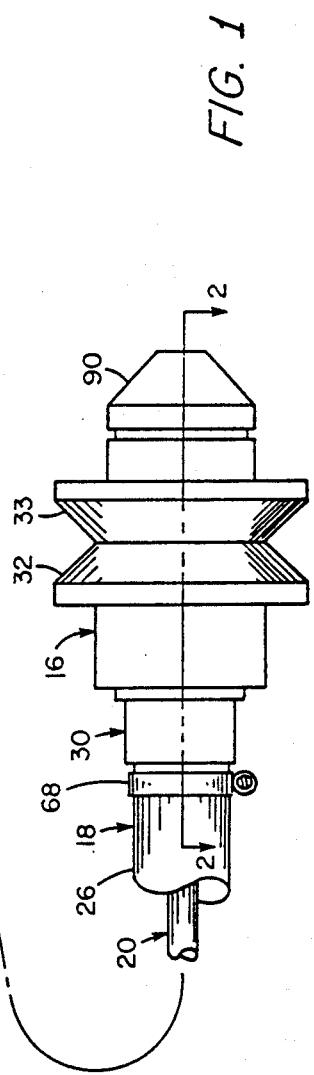
FIG. 1A
FIG. 1

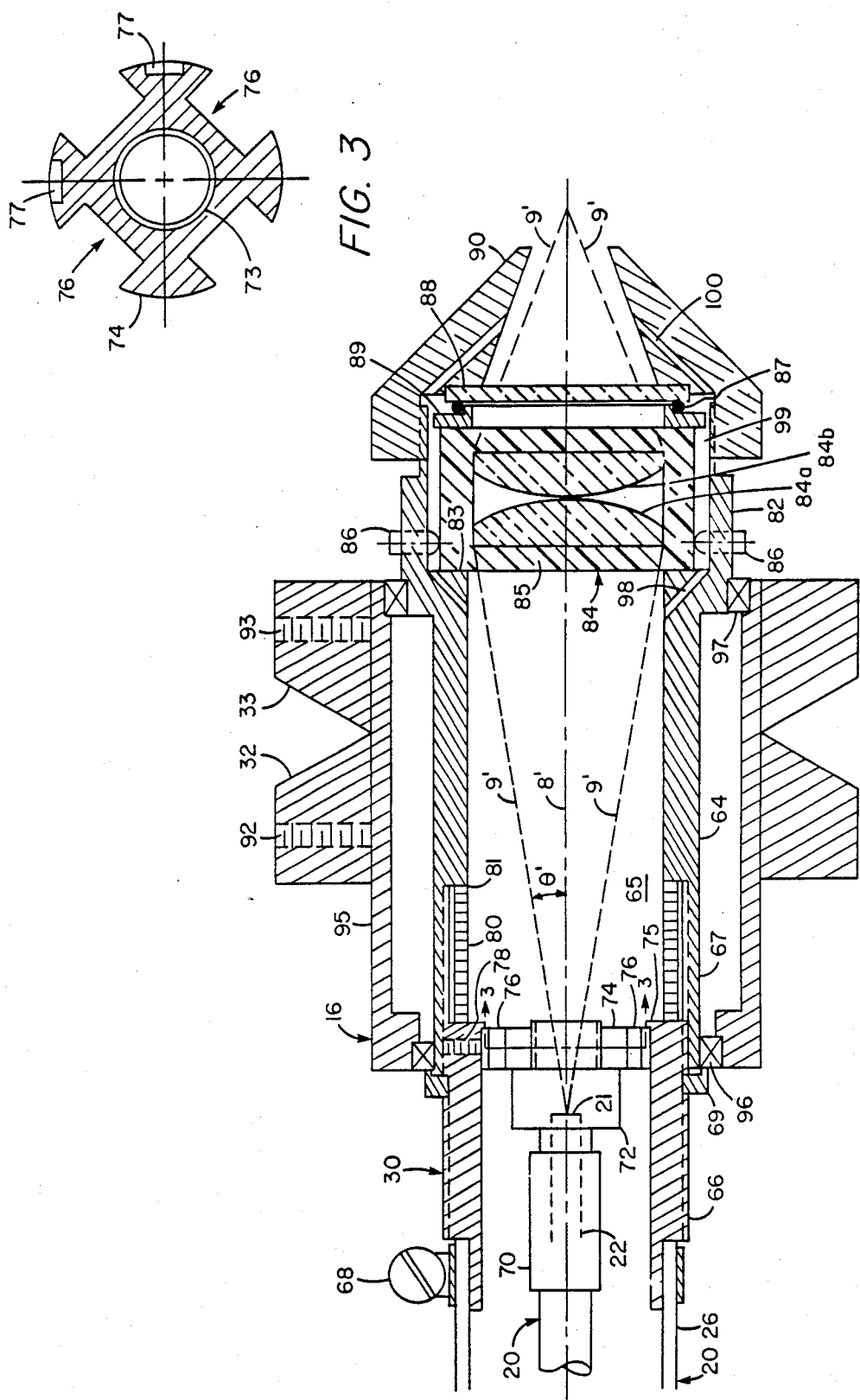

FIBER OPTIC BEAM DELIVERY SYSTEM FOR HIGH-POWER LASER

BACKGROUND OF THE INVENTION

The present invention relates to laser systems and more particularly to apparatus for transmitting a high-power laser beam onto a workpiece for drilling, cutting or welding the workpiece.

As is known in the art, high-power such as 400 Watt average power, lasers have a wide variety of applications, such as precision drilling, cutting and welding of metal workpieces. Neodymium: Yttrium-aluminum-garnet (Nd:YAG) lasers are particularly useful for such purposes. The beam generated by a laser, such as a Nd:YAG laser, must be transmitted to a work station where the beam is directed onto the material to be processed, that is, the workpiece. In the prior art, an assembly of mirrors and prisms was used to transmit the laser beam to the work station. While such arrangement functioned satisfactorily in some applications, such system is bulky and the flexibility with which the beam may be maneuvered about the workpiece limited.

Recently, fiber optic cable capable of transmitting such high-power laser energy has been developed, and the possibility of integrating such fiber optic cable into a system for delivering a laser beam to a work station for material processing (e.g. drilling, cutting and welding) has been discussed.

SUMMARY OF THE INVENTION

In accordance with the present invention, a system is provided for delivering a laser beam through a fiber optic cable to a workpiece. The system comprises means for focusing the laser beam onto a first end of the cable, with cooling agent being applied to the first end of the cable. The laser beam propagates through the cable and emerges from a second end thereof, the cooling agent being transmitted coaxially with the fiber optic cable along the length thereof. Also included are means, receiving the emerging laser beam, for focusing such beam onto the workpiece. The transmitted cooling agent is applied to the second end of the cable and injected onto the workpiece coaxially with the focused beam. With such arrangement, a laser beam may be delivered to a workpiece for processing (e.g. drilling, cutting, welding, etc.) the workpiece via a flexible system, allowing the beam to be dexterously maneuvered about the workpiece.

In a preferred embodiment of the present invention, means are provided for generating a laser beam. The laser beam is focused onto a first end of a fiber optic cable, the first end of the cable being cooled with a cooling agent. The fiber optic cable includes means for transmitting the cooling agent coaxially with the fiber optic cable along the length thereof. Also provided are means, disposed at a second end of the fiber optic cable, for receiving the laser beam emergent from the second end of the fiber optic cable and for focusing such beam onto a workpiece. The receiving and focusing means includes means for applying the transmitted cooling agent to the second end of the fiber optic cable and to the workpiece coaxially with the laser beam. With such arrangement, heat generated at each end of the fiber optic cable and along the length thereof by the high-power laser beam is dissipated by the cooling agent without impairing the flexibility of the laser beam delivery system. Also, since the cooling agent is applied to the workpiece coaxially with the laser beam, the cooling agent may comprise an element which assists the laser beam in processing the workpiece.

The system also includes means for facilitating the connection of the receiving and focusing means to an arm, the arm maneuvering said receiving and focusing means through a plurality of positions with respect to the workpiece. The facilitating means includes means for inhibiting rotation of the receiving and focusing means while the arm maneuvers the receiving and focusing means. Thus, rotational strain is prevented from being applied to the fiber optic cable, reducing the possibility of cable breakage during operation.

BRIEF DESCRIPTION OF THE DRAWINGS

The foregoing features of the present invention and the advantages thereof may be fully understood from the following detailed description read in conjunction with the accompanying drawings wherein:

FIG. 1 is a partially-sectioned, elevational view of the fiber optic laser beam delivery system of the present invention;

FIG. 1A is an enlarged cross-sectional view, taken along line 1A—1A, of a portion of the fiber optic laser beam delivery system of FIG. 1.

FIG. 2 is a cross-sectional view, taken along line 2—2 of FIG. 1, of one of the devices of the fiber optic laser beam delivery system of FIG. 1; and FIG. 3 is a cross-sectional view, taken along line 3—3 of FIG. 2, of one of the components of the device of FIG. 2.

DESCRIPTION OF THE PREFERRED EMODIMENT

Referring now to FIG. 1, and FIG. 1A the fiber optic laser beam delivery system 10 of the present invention is shown. The delivery system 10 comprises laser 12, here a Neodymium: Yttrium-aluminum-garnet (Nd:YAG) laser, fiber optics interface assembly 14 and beam delivery assembly 16. Interface assembly 14 and delivery assembly 16 are interconnected as shown by fiber optic cable assembly 18, partially cut away in FIG. 1A for clarity. Fiber optic cable assembly 18 comprises a fiber optic cable 20 enclosed in a flexible rubber tubing 26. Fiber optic cable 20 here comprises a single, relatively large core (here 1.00 mm diameter) quartz fiber 21. Quartz fiber 21 is surrounded by doped quartz cladding 22, here selected to be 0.1 mm thick and further enclosed in a PVC protective sheath 24. Fiber optic cable 20 is commercially available and here is supplied by Dainichi-Nippon Cables, Ltd., of Tokyo, Japan as part number SM-1000. A first end of fiber optic cable assembly 18 terminates in plug 19, adapted for mating with fiber optics interface assembly 14, as shown. Fiber optics interface assembly 14, shown partially sectioned for clarity, is mounted in a conventional manner to the output coupler of laser 12 by bolting flange 11 of laser 12 to mating flange 15 of interface assembly 14. The details of fiber optics interface assembly 14 and plug 19 will be discussed hereinafter. Suffice it here to say that interface assembly 14 couples the laser beam produced by laser 12 into fiber optic cable 20 by focusing such beam into the center of quartz core fiber 21. Plug 19 includes fitting 28 through which a cooling agent, such as a gas, is applied to cool the first end of fiber optic cable 20.

A second end of fiber optic cable assembly 18 terminates in end cap 30, which mates with beam delivery assembly 16. The details of such connection and of beam delivery assembly 16 are fully described hereinafter. Suffice it here to say that beam delivery assembly 16 receives the laser beam which emerges from the second end of quartz core fiber 21 and focuses the emergent beam onto a metal workpiece (not shown) for cutting, drilling or welding the workpiece secured to a worktable (also not shown). The beam delivery assembly 16 is rotatably mounted, in a manner to be described, to clamp rings 32, 33 which are adapted to facilitate connection of beam delivery assembly 16 to a conventional robot arm (not shown). As is known, the robot arm may be computer-controlled to maneuver beam delivery assembly 16 about the workpiece. The flexibility of the fiber optic cable assembly 18 allows beam delivery assembly 16 to be dexterously maneuvered about the workpiece, permitting complex cutting, drilling or welding operations to be performed precisely and rapidly. The rotatable coupling between beam delivery assembly 16 and the robot arm ensures that no tortional stress is applied to fiber optic cable assembly 18 during maneuvering of the workpiece, thus preventing fiber optic cable 20 from being twisted and reducing the possibility of fatigue and breakage of fiber optic cable 20 during operation.

The gas cooling agent applied to plug 19 via fitting 28 flows along the length of fiber optic cable assembly 18 coaxially with fiber optic cable 20, thus cooling cable 20 as high power laser energy, such as 400 Watts average power, propagates through quartz core fiber 21. The gas coolant also enters end cap 30, cooling the second end of fiber optic cable 20, flows through chamber 65 in beam delivery assembly 16 (see FIG. 2) and is injected out of nozzle 90 of beam delivery assembly 16 coaxially with the beam focused onto the workpiece. Thus, it may be appreciated that the same gas used to cool fiber optic cable 20 from the heat caused by the propatation of the high-power laser beam therethrough may be the same gas used to assist the focused beam in processing the metal workpiece. Thus, if the metal is to be cut or drilled, oxygen, which as is known assists laser cutting and drilling, may be used as the gas. In welding applications, an inert gas, such as helium or argon may be used to both cool fiber optic cable 20 and provide a gaseous "cover" for the welding operation.

Fiber optics interface assembly 14 comprises a generally tubular-shaped body 34 having a longitudinal passage 36 disposed centrally therein. A first end 35 of body 34 is adapted for mounting to a laser beam generator 12 via conventional flange 15. Flange 15 is disposed on body 34 within groove 37. Mounted within passage 36 is an afocal beam expander comprising diverging lens 38 and converging lens 40, such lenses here being quartz, anti-reflection (AR) coated lenses. Diverging lens 38 is secured within a conventional lens mount 42 by retainer ring 39, lens mount 42 being fixed within passage 36 by conventional means such as a plurality set screws 43. Converging lens 40 is conventionally held within lens mount 44 by retainer ring 41. Lens mount 44 is slideably mounted within body 34 to allow for adjustment of the laser beam focus, as will be explained. Lens mount 44, and hence converging lens 40, is locked in place at the selected position within body 34 by screw 45. Also disposed within passage 36 is focusing lens 46 mounted as shown in conventional lens mount 48 and secured therein by retainer ring 47. The afocal beam expander comprising lenses 38, 40 is used to present focusing lens 46 with a relatively wide beam having a predetermined diameter, allowing a lens having a standard focal length to be used as focusing lens 46. Here, focusing lens 46 is selected to have a focal length of +4.0 inches. The focal lengths of lenses 38, 40 were chosen to be −2.5 and +6.0 inches, respectively. Lenses 38, 40 and 46 are aligned with the first end of fiber optic cable 20 along optic axis 8 of fiber optics interface assembly 14.

Focusing lens 46 focuses the expanded laser beam onto the first end of fiber optic cable 20. Thus, the focal lengths of expander lenses 38, 40 and of focusing lens 46 are selected to produce a focused laser beam spot image on the first end of quartz core fiber 21 having a diameter smaller than that of quartz core fiber 21. This results in a maximum focused laser spot diameter of 0.85 mm on the 1.00 mm diameter core fiber 21. As stated, the focused spot size can be minimized by slideably adjusting the position of converging lens 40. The angular position of focusing lens 46 may be adjusted in order to center the focused laser beam spot image on the first end of core fiber 21 by adjusting the angular position of lens mount 48 within passage 36. Such adjustment is achieved using the four centering screws 50 (only two being shown in FIG. 1), such four screws being disposed through body 34 and around lens mount 48 orthogonally to one another. Lens mount 48 is roughly centered within passage 36 by rubber O-rings 52, which additionally serve the dual purpose of providing compliance for centering screws 50 and a dust seal for lenses 38, 40, 46.

Plug 19 comprises metal sleeve 54, adapted to receive the first end of fiber optic cable assembly 18. Rubber tubing 26 fits over end section 55 of sleeve 54 and is conventionally secured and sealed thereon by hose clamp 56. Gas fitting 28 is disposed in sleeve 54, allowing a gas source (not shown) to be coupled thereto. Gas passes through fitting 28 and passage 29 into the hollow central portion of sleeve 54 in the proximity of the first end of fiber optic cable 20, for purposes to be fully described. Plug 19 also comprises mating section 58, a generally cylindrically-shaped member having a central passage 59. Mating section 58 is adapted to receive at a first end thereof sleeve 54, as shown. The connection between mating section 58 and sleeve 54 is secured by screws 57 and is sealed by silicone O-ring 53. Such sealing is necessary to prevent gas injected via fitting 28 from flowing into mating section 58 and the remainder of fiber optics interface assembly 14. The first end of mating section 58 is also adapted to threadably receive and secure the first end of fiber optic cable 20 via adapter 60. Adapter 60 is a conventional device, here being a D-80HL-S (without collimator plate), sold by Dainichi-Nippon Cables, Ltd., of Tokyo, Japan. A first end of adapter 60 threadably engages opening 61 in the first end of mating section 58. The second end of adapter 60 is threadably engaged by plug 62, disposed on the first end of fiber optic cable 20. Plug 62 is also a conventional device, here a D-80HP/1000 supplied by Dainichi-Nippon Cables, Ltd. The central portions of plug 62 and adapter 60 are hollow and are here coated with a layer of copper for purposes to be described. Quartz core fiber 21 and doped quartz cladding 22 extend beyond the end of plug 62 into adapter 60, as shown in phantom in FIG. 1A, and are held in place within adapter 60 by the mechanical connection between plug 62 and adapter 60. The copper layer extends coterminously into adapter 60 with core 21 and cladding 22. A small space must be maintained between the outside of cladding 22 and the copper coating inside of adapter 60 or the fiber optic cable will not function properly. Since adapter 60 is hollow, the end of quartz core fiber 21 is exposed to the central passage 59 of mating section 58, which is itself exposed to the optics of fiber optics interface assembly 14.

The second end of mating section 58 fits within the end of body 34 by a predetermined amount and is held in place thereon in a conventional manner, such as by set screws 51. It may thus be appreciated that the first end of core fiber 21 is held a predetermined distance away from focusing lens 46. Thus, the only focusing adjustment necessary in the optics system of fiber optics interface assembly 14 is that obtained by slideably displacing converging lens 40 in the manner discussed above.

Referring now to FIG. 2, beam delivery assembly 16 is shown in detail. Beam delivery assembly 16 comprises a tubular body 64 having the second end of fiber optic cable assembly 18 coupled thereto at a first end 67 thereof. The second end of fiber optic cable assembly 18 terminates in end cap 30. End cap 30 comprises hollow member 66. Rubber tubing 26 fits onto end cap member 66 as shown and is secured and sealed thereto by hose-clamp 68. Conventional plug 70 is secured to the second end of fiber optic cable 20 in the same manner as discussed above. Plug 70 is here a D-80HP/1000, supplied by Dainichi-Nippon Cables, Ltd. Plug 70 threadably engages a first end of adapter 72, also a conventional device sold by Dainichi-Nippon Cables, Ltd. as part number D-80HL-S (without collimator).

A second end of adapter 72 threadably engages central portion 73 of holder 74. A cross-sectional view of holder 74 is shown in FIG. 3. Holder 74 is a generally circular member sized to fit snugly within the terminal portion of end cap member 66, as shown in FIG. 2. A plurality of openings 76 are disposed around holder 74 to provide passageways therethrough to allow the coolant gas present in fiber optic cable assembly 18 to flow into central passage 65 of body 64 for purposes to be described. Holder 74 is secured within end cap 30 by protrusions 75 on member 66 and by set screws 78, such set screws extending through member 66 and into notches 77 in holder 74. The central portions of plug 70 and adapter 72 are hollow and are here coated with a layer of copper for purposes to be discussed. Quartz core fiber 21 and doped quartz cladding 22 extend beyond the end of plug 70 and into adapter 72, as shown in phantom in FIG. 3, and are held in place within adapter 72 by the mechanical connection between plug 70 and adapter 72. The copper coating extends into adapter 72 coterminously with core 21 and cladding 22. A small space is maintained between cladding 22 and the copper layer within adapter 72, such spacing being necessary for proper functioning of fiber optic cable 20. Since adapter 72 is hollow, the second end of quartz core fiber 21 is exposed to central passage 65 of body 64, allowing the laser beam delivered by fiber optic cable 20 to emerge into passage 65, as will be discussed.

End cap member 66 threadably engages the first end 67 of tubular body 64, extending a predetermined distance into first end 67, such predetermined distance being dependent on the length of spacer ring 80. Spacer ring 80 is disposed within first body end 67 and abuts rim 81, as shown. Spacer ring 80 thus determines the location of the second end of core fiber 21 with respect to the other elements disposed in beam delivery assembly 16. End cap member 66 is locked in place on body 64 by nut 69.

The second end 82 of body 64 supports multi-element lens assembly 84, which here is a conventional condenser comprising a pair of lenses 84a, 84b disposed within housing 85 and aligned with the second end of fiber optic cable 20 along optic axis 8' of beam delivery assembly 16. Lens assembly 84 is commercially available and here is supplied by Melles-Griot of Danbury, Conn. as part number 01-CMP-011. Lens assembly 84 is held within body 64 by a plurality, here four, of set screws 86, arranged orthogonally around second body end 82. Set screws 86 are also used to center lens assembly 84 within body 64, as will be described. A window 88, here fabricated from quartz, is disposed adjacent lens assembly 84 to protect lens 84b from backspattered material from the workpiece. Spacer 89 separates window 88 from lens assembly 84. A rubber O-ring 87 is disposed as shown between spacer 89 and window 88 to seal the region betwen lens assembly 84 and window 88, thus preventing dust and fumes from entering such region. Nozzle 90, which threadably engages second body end 82, holds lens assembly 84, spacer 89, O-ring 87 and window 88 rigidly in place within body 64 against rim 83 thereof. It is noted that such arrangement allows replacement of window 88 without disturbing the alignment of lens assembly 84 within body 64 (as set by screws 86).

As previously discussed, the present invention provides for injection of a cooling agent, such as a gas, into the first end of fiber optic cable assembly 18 via fitting 28. As also discussed, holder 74 includes openings 76 to allow such gas to flow out of the second end of fiber optic cable assembly 18 into central chamber 65 of body 64. Second end 82 of body 64 is fluted with a plurality of grooves 98 to allow the gas to pass from chamber 65 into the space 99 between lens assembly 84, spacer 89, window 88 and second end 82 of body 64. The periphery of spacer 89 also includes several slots (not shown) to assist the flow of gas therearound. A plurality of passages 100 axially disposed in nozzle 90 allow the gas to flow through nozzle 90 and be injected onto the workpiece coaxially with the delivered laser beam.

Beam delivery assembly 16 also includes means for facilitating the connection of beam delivery assembly 16 to an arm (not shown), such as a robot arm, for maneuvering beam delivery assembly 16 about the workpiece. In the preferred embodiment, such means comprises clamp rings 32, 33 mounted by set screws 92, 93 on outer tubular member 95. Outer tubular member 95 is of the same general shape as first end 67 of body 64. Outer tubular member 95 is slightly larger in diameter than first end 67, thus fitting over first end 67, as shown. Tubular member 95 is rotatably mounted on body 64 by conventional bearings 96, 97, which are press fit into body 64 and tubular member 95. Locking nut 69 fits over bearing 96. Thus, when nut 69 is tightened to lock end cap 30 into body 64, the nut also exerts lateral force against bearing 96, such lateral force also being applied to bearing 97 via tubular member 95. Thus, bearings 96, 97 are "preloaded", that is, the lateral force prohibits any sideways play in bearings 96, 97. Clamp rings 32, 33 are shaped to be held in a robot gripper, though the exact shapes of clamps 32, 33 will depend on the robot gripper employed. The use of bearings 96, 97 ensures that as the wrist of the robot arm rotates while maneuvering beam delivery assembly 16 about the workpiece, outer tubular member 95 rotates about body 64. Thus, beam delivery assembly body 64 and fiber optic cable assembly 18 do not twist in response to any rotation of the robot arm. Therefore, the possibility of fiber optic cable breakage due to fatigue is greatly reduced.

In operation, and referring again to FIG. 1 and FIG. 1A, Nd:YAG laser 12 produces a high-power laser beam 9 suitable for cutting, drilling and welding applications. Here the average power of the laser beam is 400 Watts. Laser beam 9 is expanded as shown by the afocal beam expander comprising lenses 38, 40. Focusing lens 46 in fiber optics interface assembly 14 focuses the expanded laser beam onto the first end of quartz core fiber 21. As discussed above, the position of converging lens 40 is adjusted along the length of body 34 to minimize the spot diameter of the image focused on the first end of core fiber 21. Screws 50 are adjusted to precisely center the focused spot on core fiber 21.

The angle $\theta$ at which the focused beam is incident on fiber optic cable 20 with respect to the optic axis 8 of fiber optics interface assembly 14 is less than the half-angle of fiber optic cable 20. The half-angle of a given fiber optic cable is defined as the maximum angle at which such fiber optic cable can accept light rays, and is equal to the arc sine of the numerical aperture (N.A.) of the cable divided by the index of refraction of the medium containing the light rays (here, 1 since the medium is air). The N.A. of fiber optic cable 20 is a function of the difference between the indicies of refraction of core 21 and cladding 22. The SM-1000 fiber used here has an N.A. of 0.2. Thus, the half angle of fiber optic cable 20 is 11.5°. Lenses 38, 40, 46 (having the focal lengths discussed previously) must be chosen accordingly to produce an incidence angle $\theta$ less than 11.5°.

With the focused laser beam centered on core filter 21 and incident thereon at the proper angle $\theta$, a maximum amount of laser power is transferred into the first end of fiber optic cable 20. The energy coupled into fiber optic cable 20 propagates therethrough by total internal reflection along the boundary between quartz core fiber 21 and doped quartz cladding 22. However, even with such maximum efficiency, laser energy is lost in the form of heat during coupling into fiber optic cable 20 due to reflection from the end of quartz core fiber 21. Such heat is dissipated, however, by the layer of copper disposed along the inside of adapter 60 and plug 62. Thus, such copper layer functions as a heat sink to draw the reflection-produced heat away from the end of fiber optic core 21 and spread such heat out over a relatively large area. The heated copper layer is itself cooled by the gas injected into fiber optic cable assembly 18 via fitting 28. Such gas also flows along the length of fiber optic cable assembly 18 coaxially with the laser beam propagating through fiber optic cable 20. The gas is maintained within cable assembly 18 by flexible hose 26, which also serves to protect fiber optic cable 20 from breakage.

Referring now to FIG. 2, the laser beam 9' emerges from quartz core fiber 21 at the second end of fiber optic cable 20. The emergent beam 9' makes an angle $\theta'$ with the optic axis 8' of beam delivery assembly 16 equal to the half-angle of fiber optic cable 20, which, as discussed, is 11.5°. Such angle $\theta'$ and the distance between the second end of fiber optic cable core 21 and lens assembly 84 dictates the entrance aperture of the lens assembly 84. The emergent beam 9' is focused by lens assembly 84 onto the workpiece. Proper focus of the emergent beam onto the workpiece depends on the distance x between the second end of core fiber 21 and lens assembly 84, the distance y between lens assembly 84 and the workpiece, the effective focal length F of lens assembly 84, and the desired diameter of the focused laser beam spot on the workpiece. By the simple lens formula, it is known that: $1/x + 1/y = 1/F$. In the preferred embodiment, lens assembly 84 is selected to have an F of 25 mm. Additionally, the ratio of y/x will determine the diameter of the spot focused on the workpiece (i.e. the magnification of the laser beam image). The distance x is determined by the length of spacer ring 80. Thus, it is seen that the length of spacer 80 in part determines the diameter of the focused laser spot on the workpiece.

For cutting or drilling applications, precision is best obtained by focusing the emergent laser beam to a very small spot on the workpiece, for example, a spot 0.5 mm in diameter. Thus, in such case, y/x=0.5. Thus, distances x and y can be determined from the following equations:

$$1/x + 1/y = 1/25$$

$$y/x = 0.5$$

A little thought reveals that distances x and y are 75 mm and 37.5 mm, respectively. Therefore, spacer 80 is selected to maintain a distance of 75 mm between the second end of core fiber 21 and lens 84a of lens assembly 84. Likewise, the robot arm (not shown) must maintain a 37.5 mm spacing between lens 84b of lens assembly 84 and the workpiece while maneuvering beam delivery assembly 16 above the workpiece during cutting or drilling.

In welding applications, the diameter of the laser beam spot focused on the workpiece may be larger than that used in drilling or cutting, since precision need not be as great during welding. Thus, here the spot size is selected to be 0.75 mm for welding. Using the equations recited above, it is seen that the distance (x) between the second end of core fiber 21 and lens 84a of lens assembly 84 need be 58.3 mm. Such separation is achieved by selecting the proper length for spacer 80. The distance (y) between lens 84b and the workpiece is calculated to be 43.8 mm.

In all applications, however, the focused laser beam is centered to be positioned on the optic axis 8' by the proper angular adjustment of lens assembly 84 with respect to optic axis 8' via centering screws 86. Centering screws 86 also hold lens assembly 84 in place within body 64. Thus, with the arrangement of the present invention, quartz window 88 may be replaced by removing nozzle 90 without having to realign lens assembly 84, due to the securing effect of screws 86.

As discussed above, a cooling agent, such as a gas, is injected into fiber optic cable assembly 18 through fitting 28 (FIG. 1A). Such gas cools the first end of fiber optic cable 20 by convection and flows coaxially with cable 20 through fiber optic cable assembly 18, also cooling the length of cable 20. At the second end thereof, the gas flows through openings 76 in holder 74. Heat is generated at the second end of fiber optic cable 20 as the laser beam couples out of core fiber 21, such heat being partially dissipated by the copper layer disposed inside of plug 70 and adapter 72. The flow of gas around plug 70 and adapter 72 through openings 76 further dissipates the heat by convection. The gas then flows through fluted grooves 98 in body 64 and around lens assembly 84, window 88 and spacer 89 in space 99. The gas then flows through slots 100 in nozzle 90 and is injected onto the workpiece coaxially with the laser beam. Thus, the composition of the gas may be selected to be that which is most useful to the particular application of the laser beam, that is, cutting, drilling or welding. As is known, when a laser beam is used to cut or drill through a workpiece, oxygen ($O_2$) injected onto the workpiece will assist the cutting or drilling process. Thus, when system 10 is used to cut or drill through a workpiece, a source (not shown) of oxygen is coupled to fitting 28. Thus, in such applications, oxygen is used in the present invention both as a laser assist gas and as a cooling agent for the first and second ends of fiber optic cable 20 in the manner heretofore discussed.

When a laser is used for welding at a workpiece, however, an inert gas, such as helium or argon is commonly injected onto the workpiece as a "cover" gas, that is, a gas which displaces the air over the surface of the workpiece to be welded in order to prevent nitride or oxide formation at the weld joint and thus make such joint more sound. Thus, when system 10 is used for welding, a source (not shown) of an inert gas is coupled to fitting 28. Thus, the inert gas is used in the present invention as a "cover" gas and as a cooling agent to cool the first and second ends of fiber optic cable 20.

Having described a preferred embodiment of the present invention, modifications and alterations may become apparent to those of ordinary skill in the art. Therefore, it is understood that the scope of this invention is limited only by the appended claims.

What is claimed is:

1. In combination:
   means for generating a laser beam;
   means for focusing the laser beam onto a first end of a fiber optic cable, said focusing means comprising means for applying a cooling agent to the first end of the fiber optic cable;
   wherein said fiber optic cable includes means for transmitting the cooling agent coaxially with the fiber optic cable along the length of the fiber optic cable; and
   means, disposed at a second end of the fiber optic cable, for receiving the laser beam emergent from the second end of the fiber optic cable and for focusing the emergent laser beam onto a workpiece, said receiving and focusing means including means for applying the transmitted cooling agent to the second end of the fiber optic cable and to the workpiece coaxially with the laser beam.

2. The combination of claim 1 further comprising a handle for the receiving and focusing means, said handle being rotatably mounted about said receiving and focusing means.

3. Apparatus for focusing a laser beam onto an end of a fiber optic cable, such apparatus comprising:
   means, aligned with the end of the fiber optic cable along an optical axis, for expanding the beam;
   means disposed on the optical axis, for focusing the expanded beam onto the end of the fiber optic cable, the focusing means including means for centering the focused beam on the end of the fiber optic cable; and
   means for applying a cooling agent to the fiber optic cable in the proximity of the end thereof, said applying means comprising means for preventing exposure of the cooling agent to the focusing means and the expanding means.

4. The apparatus of claim 3 wherein the expanding means comprises a pair of lenses, and further comprising means for adjusting the focusing of the expanded beam, the adjusting means comprising means for moving one of the pair of lenses along the optical axis with respect to the other one of the pair of lenses and the focusing means.

5. Apparatus for receiving a laser beam emergent from an end of a fiber optic cable, the apparatus comprising:
   means for focusing the emergent beam onto a workpiece with a predetermined diameter, said focusing means comprising means for adjusting the predetermined diameter of the focused beam, said adjusting means comprising means for varying a spacing between the end of the fiber optic cable and the focusing means;
   means for receiving a cooling agent coaxially with the fiber optic cable and applying said cooling agent to the end of the fiber optic cable; and
   means for applying said cooling agent to the workpiece coaxially with the focused laser beam.

6. The apparatus of claim 5 wherein the focusing means comprises a lens aligned with the end of the fiber optic cable along an optic axis, the apparatus further comprising means for altering the angular position of the lens with respect to the optic axis positioning the focused beam on the optic axis.

7. The apparatus of claim 5 further comprising a handle rotatably coupled to the apparatus and the end of the fiber optic cable.

8. The apparatus of claim 6 further comprising removable window means, disposed between the lens and the workpiece, for protecting the lens from portions of the workpiece spattered by the laser beam, wherein said angular position altering means comprises means for maintaining the angular position of the lens with respect to the optic axis with the window means are removed.

9. In combination:
   a fiber optical cable;
   means for focusing a laser beam onto a first end of the fiber optical cable, said focusing means comprising:
   (i) means for expanding the laser beam;
   (ii) means for focusing the expanding laser beam onto the first end of the fiber optical cable; and
   (iii) means for applying a coolant to the first end of the fiber optic cable, the coolant being transmitted coaxially with the fiber optic cable along the length of the fiber optic cable;
   means, disposed at a second end of the fiber optic cable, for receiving the laser beam emergent from the second end of the fiber optical cable, said receiving means comprising:
   (i) means for focusing the emergent laser beam onto a workpiece;
   (ii) means for applying the transmitted coolant to the second end of the fiber optic cable; and
   (iii) means for coupling the transmitted coolant to the workpiece coaxially with the laser beam.

10. The combination of claim 9 wherein the means for focusing the laser beam onto the first end of the cable comprises a first body having a first optical axis, the laser beam being incident at a first end of the first body along the first optical axis and the first end of the fiber optic cable being mounted at a second end of said first body on said first optical axis, said expanding means comprising a first lens disposed on the first optical axes at the first end of the body, and said means for focusing the expanded beam comprising a second lens disposed on the first optical axis between the first lens and the first end of the fiber optic cable.

11. The combination of claim 10 wherein the expanding means further comprises a third lens disposed on the first optical axis between the first and second lenses.

12. The combination of claim 11 further comprising means for varying the spacing between said second and third lenses along the first optical axis.

13. The combiantion of claim 10 further comprising means for altering the angular position of the second lens with respect to the first optical axis.

14. The combination of claim 10 wherein said means for applying the coolant to the first end of the fiber optic cable comprises:
 means, mounted on the second end of the first body proximate to the first end of the fiber optic cable, for receiving the coolant and coupling the coolant to said first end of the fiber optic cable; and
 means for inhibiting coupling of the coolant to the first and second lenses.

15. The combination of claim 9 wherein the receiving means comprises a second body having a second optical axis, the second end of the fiber optic cable being secured to a first end of th e second body on the second optical axis, and the emergent laser beam focusing means being disposed at a second end of the second body on the second optical axis.

16. The combination of claim 15 wherein the emergent laser beam focusing means comprises:
 a lens; and
 means for securing said lens to the second body and adjusting the angular position of said lens with respect to the second otpical axis.

17. The combination of claim 16 further comprising: a window disposed at the second end of the second body between the lens and workpiece; and means for securing said window to said second body independently of said lens securing and adjusting means.

18. The combination of claim 16 further comprising means for slidably adjusting the second end of the fiber optic cable along the second optical axis to adjust the spacing between said second end of the fiber optic cable and said means.

19. The combination of claim 15 wherein the receiving means further comprises a handle rotatably mounted on said second body.

* * * * *